United States Patent

[11] 3,612,566

[72] Inventor Cecil R. Sholl
 P.O. Box 681, Kodiak, Alaska 99615
[21] Appl. No. 28,826
[22] Filed Apr. 15, 1970
[45] Patented Oct. 12, 1971

[54] REMOVABLE SUPPORT WHEEL ASSEMBLY
 9 Claims, 5 Drawing Figs.
[52] U.S. Cl. ................................................. 280/47.32,
  180/5 R, 280/124 A, 280/414 A
[51] Int. Cl. ......................................................... B60g 3/02
[50] Field of Search ................................................ 280/43,
  43.17–43.19, 47.21, 47.22, 47.32, 124 A, 414, 414
  A; 9/1 T

[56] References Cited
 UNITED STATES PATENTS
 888,116  5/1908  Owens ........................... 280/124 A UX
 3,281,874  11/1966  Sholl ............................. 280/47.32 X
 3,416,813  12/1968  Sholl ............................. 280/47.32

*Primary Examiner*—Leo Friaglia
*Assistant Examiner*—Winston H. Douglas
*Attorneys*—Clarence A. O'Brien and Harvey B. Jacobson ABSTRACT: A wheel mount for removable support from one side of a boat and including an inverted generally U-shaped bridge projecting outwardly from the boat side. The bridge is defined by a pair of upstanding less interconnected at their upper ends by means of a rigid bight portion and one leg of the bridge is rigidly braced relative to the corresponding boat. An axle assembly is pivotally supported at one end portion from the lower end of the inside leg of the bridge for oscillation about a horizontal axis disposed generally normal to the plane in which the bridge is disposed for vertical swinging movement of that portion of the axle disposed adjacent the lower end of the outer leg of the bridge. A wheel is journaled on that portion of the axle extending between the lower ends of the legs of the bridge and spring structure is connected between the outer end of the bight portion of the bridge and the outer end portion of the axle which projects outwardly of the lower end of the outer leg of the bridge. The spring structure yieldingly biases the outer end of the axle downwardly and the outer leg of the bridge and the axle include coacting portions limiting vertical swinging movement of the axle and guiding the outer end of the axle against deflection out of the plane in which it is vertically swingable.

Cecil R. Sholl
INVENTOR.

Cecil R. Sholl
INVENTOR.

BY Clarence A. O'Brien
and Harvey B. Jacobson
Attorneys

REMOVABLE SUPPORT WHEEL ASSEMBLY

This invention comprises an improvement over the removable support wheel assemblies disclosed in my prior U.S. Pat. Nos. 3,281,874 and 3,416,813. The removable support wheel assembly of the instant invention includes the same basic mounting structure disclosed in my above-mentioned prior patents, but includes improved structure for spring mounting and guiding the outer end of the axle portion thereof for vertical movement.

The support wheel assembly may not only be utilized on boat hulls for converting a boat hull from travel over water to travel over roadways as a trailer, but may also be utilized on other vehicles and nonvehicle loads whereby such other vehicles and loads may also be trailed behind a towing vehicle.

The main object of this invention is to provide a support wheel assembly adapted to be used in pairs and removably supported from opposite sides of a load and for converting that load into a wheeled structure which may be readily towed behind a towing vehicle.

Another object of this invention is to provide a removable support wheel assembly in accordance with the immediately preceding object and which may be utilized to convert substantially any load into a trailer provided with independent wheel suspension.

Another object of this invention is to provide a support wheel assembly whose various bearing components may be readily replaced when desired.

Still another object of this invention is to provide a support wheel assembly including integral springing structure that may be readily replaced when it is desired to change the springing capacity of the wheel assembly so as to adapt it for supporting either lighter or heavier loads.

A final object of this invention to be specifically enumerated herein is to provide a support wheel assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
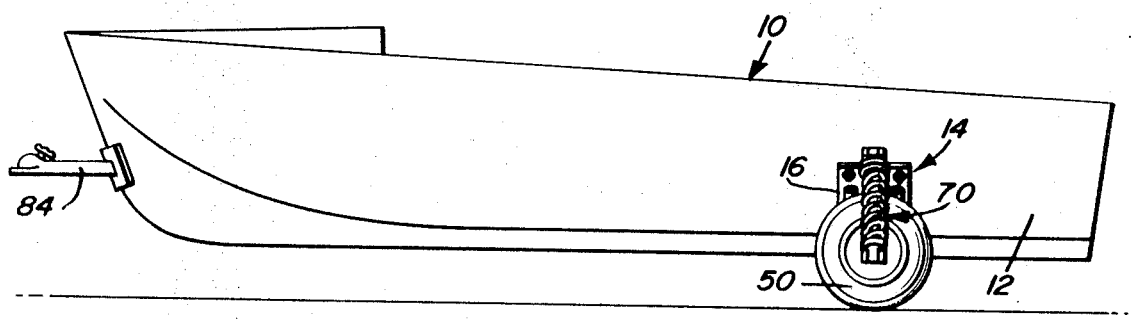
FIG. 1 is a side elevational view of a boat hull which has been transformed into a trailer for towing behind a draft vehicle by utilization of the support wheel structure of the instant invention.
Figure 2:
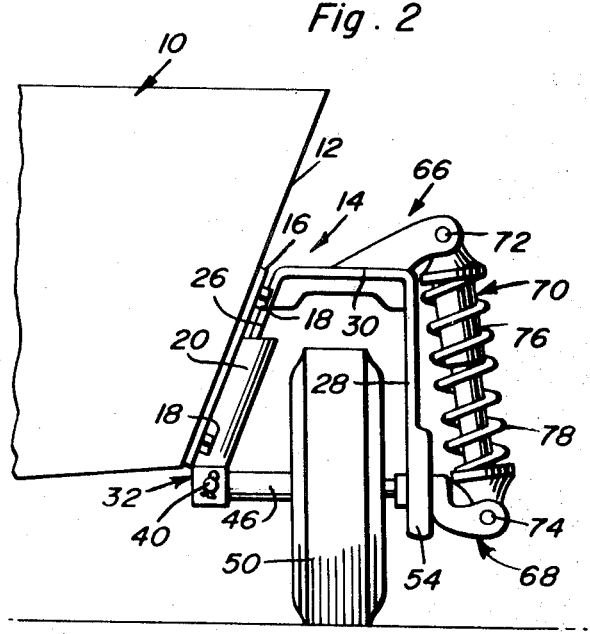
FIG. 2 is a fragmentary rear elevational view of the starboard side of the boat with the starboard wheel assembly supported therefrom.
Figure 3:
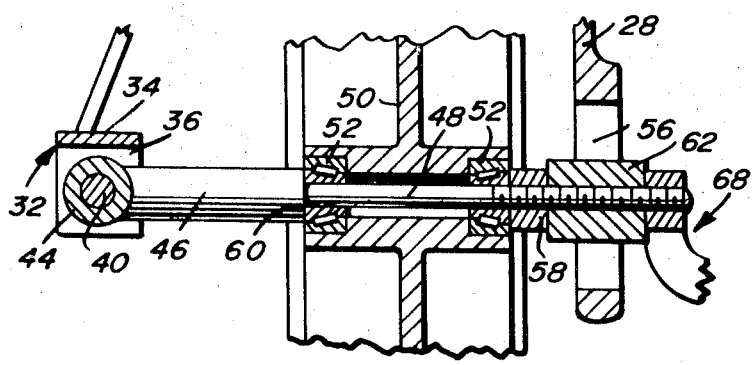
FIG. 3 is a fragmentary enlarged transverse vertical sectional view taken substantially upon a plane passing through the center axis of the axle portion of the assembly illustrated in FIG. 2.
Figure 4:
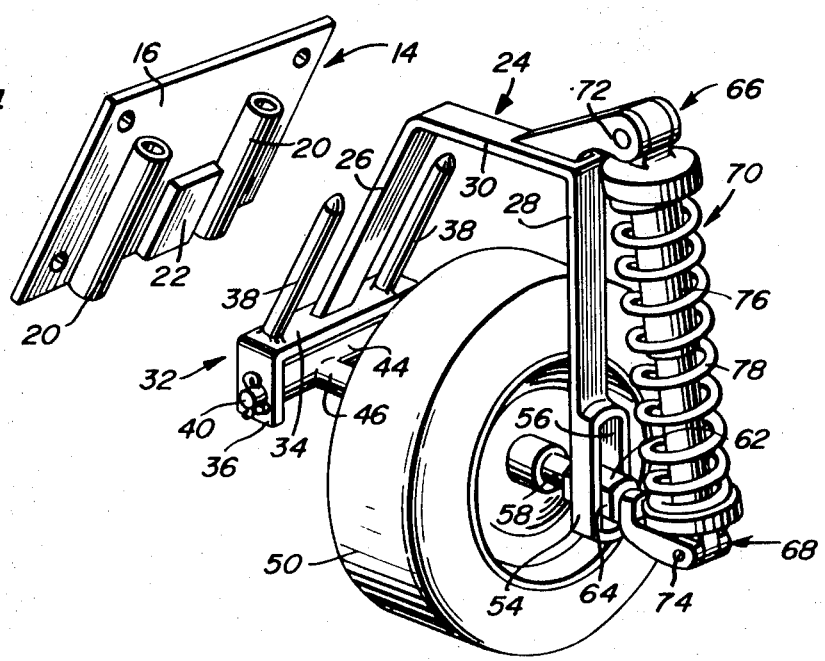
FIG. 4 is an exploded perspective view of the support wheel structure of the instant invention.

Referring now more specifically to the drawings, the numeral 10 generally designates a boat including opposite sides 12 from which a pair of removable support wheel assemblies of the instant invention and referred to in general by the reference numeral 14 are supported.

Each of the support wheel assemblies 14 includes a mounting plate 16 secured to the corresponding side 12 of the boat 10 by means of suitable fasteners 18 and each of the mounting plates 18 includes a pair of laterally spaced apart upstanding sleeves or tubes 20 and an abutment block 22 disposed between the sleeves or tubes 20.

The support wheel assembly 14 further includes a generally inverted U-shaped bridge referred to in general by the reference numeral 24 including first and second inner and outer upstanding legs 26 and 28 interconnected at their upper ends by means of a bight portion 30. The lower end of the leg 26 includes a downwardly opening yoke disposed in a plane normal to the plane of the bridge 24. The yoke, which is referred to in general by the reference numeral 32, includes a horizontal connecting member 34 whose midportion is secured to the lower end of the leg 26 and a pair of depending apertured mounting flanges 36 carried by the opposite ends of the connecting member 34. The opposite end portions the connecting member 34 also include upstanding mounting pins 38 which are upwardly receivable in the sleeves or tubes 20 with the surface of the leg 26 remote from the leg 28 abutting against the outer surface of the abutment block 22. Further, an axle pin 40 is secured through the apertured mounting flanges 36 by means of cotter pins 42 and a mounting sleeve 44 is journaled on the axle pin 40 and includes a laterally directed stub axle portion 46 upon a reduced diameter outer end portion 48 of which a support wheel 50 is journaled by means of bearings 52.

The lower end of the leg 28 includes a transversely thickened portion 54 through which a vertical slot 56 is formed. A stop sleeve 58 is threaded on the outer end portion of the stub axle portion 46 outwardly of the outermost bearing 52 and maintains proper axial spacing between the bearings 52, the inner bearing 52 being abutted against the annular shoulder 60 defined on the stub axle portion 46 by the reduced outer end portion 48. In addition, a bearing sleeve 62 including flattened diametrically opposite vertical sides 64 is disposed in surface to surface sliding engagement with the opposite vertical sides of the slot 56.

A first upper bifurcated mount referred to in general by the reference numeral 66 is secured to the outer end of the bight portion 30 and a second lower bifurcated mount referred to in general by the reference numeral 68 is threaded on the outer end portion of the stub axle portion 46 outwardly of the bearing sleeve 62. A combined telescopic strut-type shock absorber and spring assembly referred to in general by the reference numeral 70 has its upper and lower ends pivotally secured between the furcations of the mounts 66 and 68 as at 72 and 74. The assembly 70 includes a shock absorber 76 and a coil spring 78. The coil spring 78 serves to urge downwardly on the mount 68 and thus the outer end portion of the stub axle portion 46 and the shock absorber 76 serves to cushion up-and-down vertical movement of the outer end of the stub axle portion 46 as the wheel 50 moves over rough ground.

Figure 5:
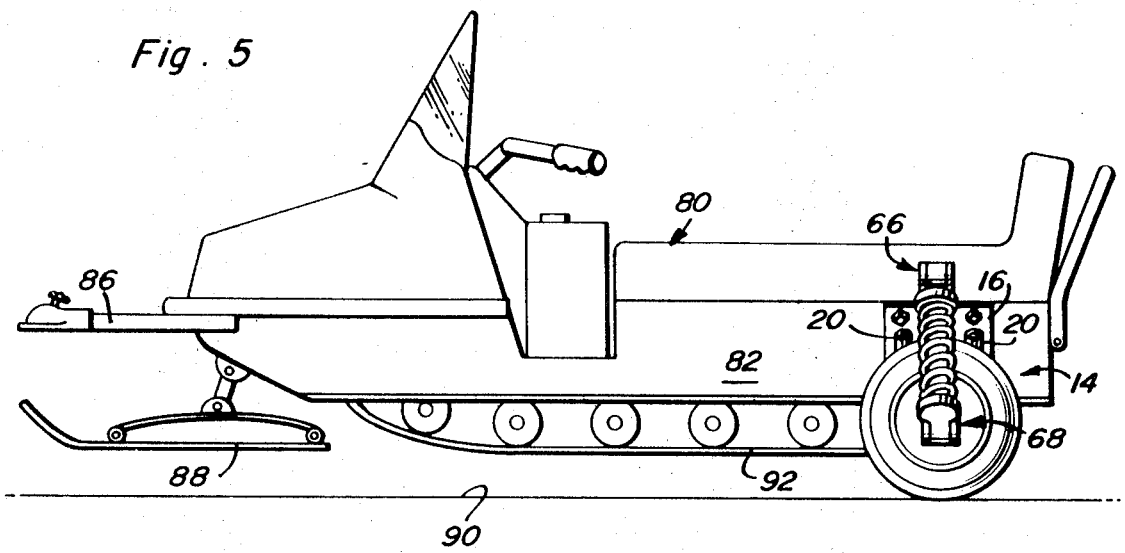
FIG. 5 is a side elevational view illustrating the manner in which other loads, such as a snowmobile, may be equipped with the supporting wheel assembly of the instant invention and towed behind a towing vehicle.

With attention now invited more specifically to FIG. 5 of the drawings there may be seen a conventional form of snowmobile referred to in general by the reference numeral 80. The opposite sidewalls 82 of the rear skirt portions of the body of the snowmobile 80 have a pair of the support wheel assemblies 14 supported therefrom in substantially the same manner in which the support wheel assemblies 14 are supported from the boat 10. In addition, a forward towing tongue 84 is secured to the bow of the boat 10 and a towing tongue 86 is secured to the forward end of the snowmobile 80 at an elevation which will result in the front skis 88 of the snowmobile 80 being elevated above the ground 90 when the towing tongue 86 is coupled to the tow hitch (not shown) of a towing vehicle.

Of course, the support wheel assemblies 14 may have all but the mounting plate portion 16 thereof removed from the boat 10 and the snowmobile 80 when the boat is to be utilized on a body of water and the snowmobile 80 is to be supported from its endless track assembly 92. However, when it is desired to trail the boat 10 and the snowmobile 80 behind towing vehicles, the support wheel assemblies may be readily mounted in operative position and the towing tongues 84 and 86 may be applied to the forward portions of the boat 10 and snowmobile 80 so as to adapt both the boat 10 and the snowmobile 80 to be trailed behind a towing vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A transporting device comprising a bracket including an upstanding plate for securement to the side of an object to be transported, a wheel mount mounted on the bracket and including an outwardly projecting axle pivotally secured to said mount at its inner end for oscillation about a horizontal axis generally normal to said axle, a ground wheel journaled on the outer end portion of said axle inwardly of the outer terminal end thereof, an inverted generally U-shaped bridge having one end portion secured to the mount, coacting means carried by the other end portion of said bridge and the axle outwardly of said wheel guidingly supporting the outer end portion of said axle from said other end portion of said bridge for limited vertical swinging relative thereto, said bridge embracingly receiving the upper peripheral portions of said wheel between the opposite end portions thereof, and force means operatively connected between an upper portion of said bridge and the outer end portion of said axle urging the latter toward its lower limit position of movement.

2. The combination of claim 1 wherein said force means includes shock absorbing means connected between said upper portion and said outer end portion.

3. The combination of claim 1 wherein the plate of said bracket includes a pair of laterally spaced upstanding sleeves spaced apart along said axis, said wheel mount including a pair of upstanding pins removably upwardly engaged in the sleeves.

4. The combination of claim 1 wherein said coacting means carried by the other end portion of said bridge and said axle includes a sleeve mounted on said axle outward of said wheel and an upstanding opening formed through said other end portion of said bridge through which said sleeve extends and in which said sleeve is slidingly guided.

5. The combination of claim 4 wherein the sidewalls of said slot lie in upstanding planes paralleling the plane in which said axle is swingable.

6. The combination of claim 5 wherein said sleeve includes flattened opposite sides defined by a pair of parallel planar surfaces paralleling the plane in which said axle is swingable, said planar surfaces being disposed in sliding surface-to-surface engagement with said sidewalls of said slot.

7. The combination of claim 1 including bifurcated mounting portions carried by and projecting outwardly from the outer end of said axle and an upper outer portion of said bridge, said force means being removably connected between said bifurcated mounting portions.

8. The combination of claim 7 wherein said force means includes shock absorbing means of the telescopic strut-type connected between said bifurcated mounting portions.

9. The combination of claim 8 wherein the plate of said bracket includes a pair of laterally spaced upstanding sleeves spaced apart along said axis, said wheel mount including a pair of upstanding pins removably upwardly engaged in the sleeves.